United States Patent [19]
Abe et al.

[11] Patent Number: 5,887,422
[45] Date of Patent: Mar. 30, 1999

[54] EXHAUST GAS PURIFICATION METHOD AND APPARATUS THEREFOR

[75] Inventors: Fumio Abe, Handa; Junichi Suzuki, Kuwana; Masato Ogawa, Komaki, all of Japan

[73] Assignee: NGK Insulators, Ltd., Japan

[21] Appl. No.: 919,359

[22] Filed: Aug. 28, 1997

Related U.S. Application Data

[62] Division of Ser. No. 638,852, Apr. 29, 1996, Pat. No. 5,662,869, which is a continuation of Ser. No. 280,529, Jul. 26, 1994, abandoned, which is a continuation of Ser. No. 8,784, Jan. 27, 1993, abandoned.

[30] Foreign Application Priority Data

Dec. 6, 1992 [JP] Japan .................... 4-335937

[51] Int. Cl.$^6$ .................... F01N 3/00
[52] U.S. Cl. .................... 60/274; 60/284; 60/297; 60/303
[58] Field of Search .................... 60/274, 284, 297, 60/307, 303

[56] References Cited

U.S. PATENT DOCUMENTS

| | | |
|---|---|---|
| 3,699,683 | 10/1972 | Tourtellotte et al. . |
| 3,757,521 | 9/1973 | Tourtellotte et al. . |
| 3,842,600 | 10/1974 | Nakajima et al. . |
| 3,896,616 | 7/1975 | Keith et al. . |
| 4,383,408 | 5/1983 | Ujihashi et al. . |
| 4,522,027 | 6/1985 | Hasegawa et al. . |
| 4,985,210 | 1/1991 | Minami . |
| 5,051,244 | 9/1991 | Dunne et al. . |
| 5,078,979 | 1/1992 | Dunne .................... 423/212 |
| 5,142,864 | 9/1992 | Dunne .................... 60/274 |
| 5,159,810 | 11/1992 | Grutter et al. . |
| 5,184,462 | 2/1993 | Schatz . |
| 5,315,824 | 5/1994 | Takeshima . |
| 5,388,405 | 2/1995 | Fujishita et al. .................... 60/297 |
| 5,447,694 | 9/1995 | Swaroop et al. . |

FOREIGN PATENT DOCUMENTS

| | | |
|---|---|---|
| 0485179 | 5/1992 | European Pat. Off. . |
| 2 686 375 | 7/1993 | France . |
| 40 33 827 A1 | 5/1991 | Germany . |
| 40 08 789 A1 | 9/1991 | Germany . |
| 2-56247 | 2/1990 | Japan . |
| 2-75327 | 3/1990 | Japan . |
| 2-135126 | 5/1990 | Japan . |

*Primary Examiner*—Thomas E. Denion
*Attorney, Agent, or Firm*—Parkhurst & Wendel

[57] ABSTRACT

An exhaust gas purification system includes an adsorbent containing an adsorbent element for adsorbing harmful compounds such as hydrocarbon in an exhaust gas and a catalyst containing a catalyst element for lowering the harmful compounds in the exhaust gas, each disposed in the exhaust gas pipe of an internal combustion engine. When an oxidizing gas is added to the exhaust gas or amounts of combustion gas and fuel are regulated, for a given period, in the process in which the hydrocarbon in the exhaust gas produced at the cold start-up of the internal combustion engine are adsorbed by the adsorbent and desorbed from the adsorbent as a temperature of the adsorbent is increased by the exhaust gas, an exhaust gas composition containing excessive oxygen is provided and the desorbed hydrocarbon are oxidized on the catalyst. With this arrangement, the harmful compounds in the exhaust gas, in particular, the hydrocarbon produced in a large amount at the cold start-up of the engine can be effectively purified.

12 Claims, 5 Drawing Sheets

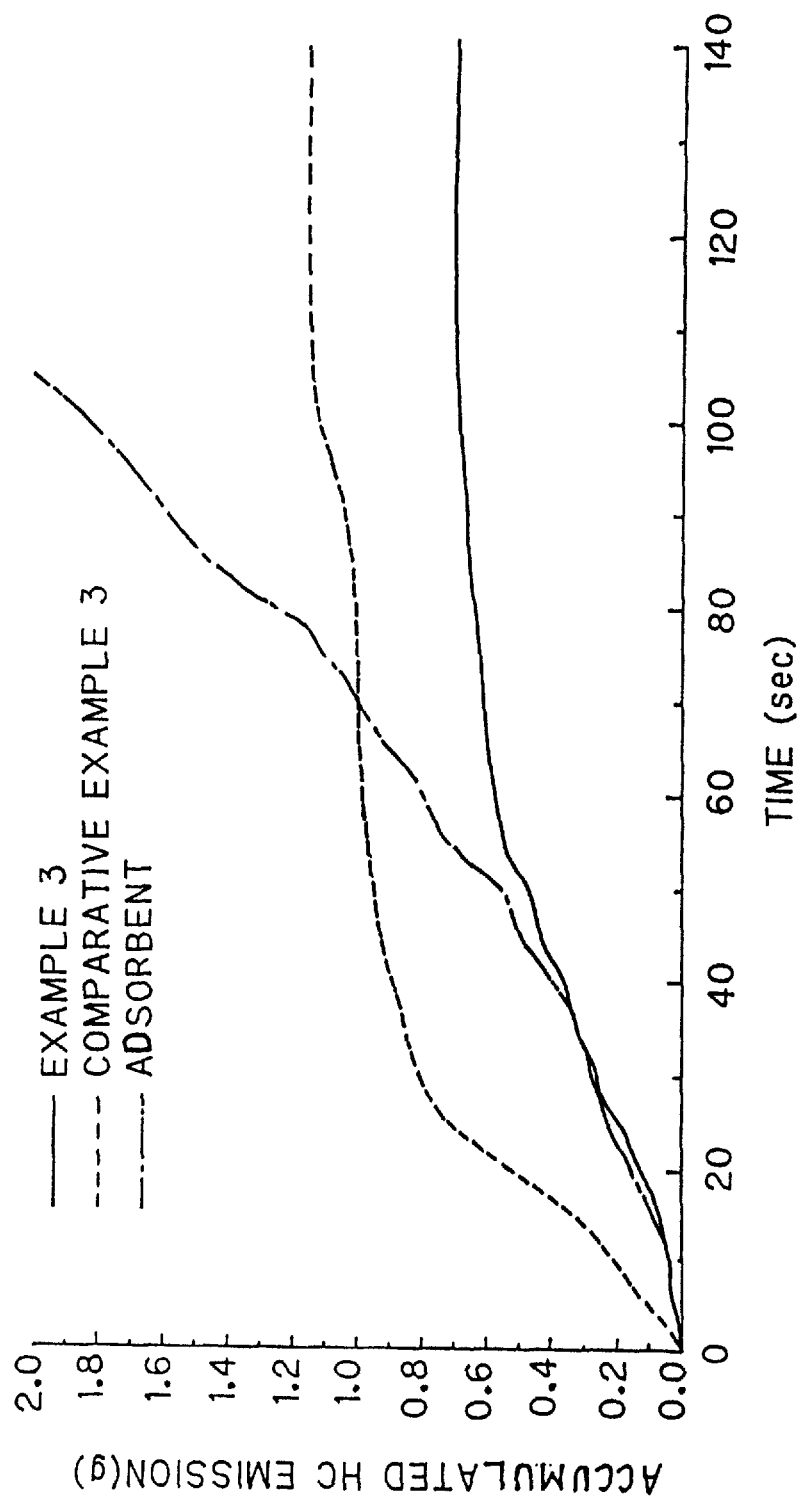

EXHAUST GAS PURIFICATION METHOD AND APPARATUS THEREFOR

This is a division of application Ser. No. 08/638,852 filed Apr. 29, 1996, now U.S. Pat. No. 5,662,869, which in turn is a continuation of application Ser. No. 08/280,529, filed Jul. 26, 1994, which in turn is a continuation of application Ser. No. 08/008,784, filed Jan. 27, 1993, both now abandoned.

BACKGROUND OF THE INVENTION AND RELATED ART STATEMENT

The present invention relates to an exhaust gas purification method and apparatus therefor, and more specifically, to an exhaust gas purification method and apparatus therefor capable of effectively purifying harmful compounds present in an exhaust gas, in particular, hydrocarbon and the like produced in a large amount at the cold start-up of engine.

In an FTP test (LA-4 mode) effected in correspondence with the intensification of an exhaust gas regulation in the United States, about 70 to 80% of hydrocarbon (hereinafter, abbreviated as HC) of the total amount thereof emitted in the test is emitted within 140 seconds (within first mode of Bag 1) at the cold start-up of an engine after engine cranking. During this period, however, since considerable time is needed before a conventional three-way catalyst reaches its operation temperature, most of the HC is exhausted without being purified.

To solve this problem, there is proposed a technique for disposing an electric heated catalyst (hereinafter, referred to as an EHC) and an adsorbent mainly composed of zeolite in an exhaust gas pipe.

A technique using the EHC is disclosed, for example, in U.S. Pat. No. 5,063,029 for a catalyst converter previously filed by the applicant. According to this technique, the EHC is energized by a battery power supply to heat forcibly and steeply a catalyst on a heater or a main catalyst disposed on a downstream side. The disclose technique is very effective to reduce the emission of HC at the cold start-up of engine.

On the other hand, as a technique using an adsorbent disposed in an exhaust gas pipe, Japanese Patent Application Laid-Open No. 75327/1990 discloses an automobile exhaust gas purification apparatus comprising a catalyst for purifying harmful compounds in an exhaust gas disposed in an exhaust gas system and Y type zeolite or mordenite disposed upstream of the catalysts. Further, Japanese Patent Application Laid-Open No. 135126/1990 discloses an automobile exhaust gas purification apparatus comprising an exhaust gas purification catalyst disposed in an exhaust gas system and an adsorbent disposed up-stream of the catalyst, the adsorbent including at least one kind of catalyst metal carried at a portion of a monolith carrier coated with zeolite.

Further, Japanese Patent Application Laid-Open No. 56247/1990 discloses an exhaust gas purification catalyst containing zeolite which comprises a first layer mainly composed of zeolite and disposed on a carrier and a second layer mainly composed of a noble metal catalyst with an oxidation/reduction ability and disposed on the first catalyst layer.

Further, EP485179 proposed by the applicant discloses a technique made by combining an EHC and adsorbent. This technique includes a catalyst converter for purifying exhaust gas by the combination of an adsorbent or adsorbent-catalyst composition coated on a heater or an adsorbent composed of a high-silica zeolite having a Si/Al ratio of at least 40 and a catalyst carried by the zeolite and main monolith catalyst and honeycomb heater.

Further, there is devised in SAE Paper No. 920847 a bypass system for disposing a valve upstream of an adsorbent as a method of desorbing HC at the stage that a catalyst is sufficiently activated.

However, the catalyst converter disclosed in U.S. Pat. No. 5,063,029 has a problem in that a dedicated battery must be mounted and a large current connection cable is needed expensive.

Further, although Japanese Patent Application Laid-Open No. 75327/1990 describes that when an exhaust gas has a temperature of 300° C. or lower, HC is adsorbed by the adsorbent in a trapper, and when the exhaust gas has a temperature exceeding 300° C., the HC is desorbed from the adsorbent and flows into a catalyst converter and is purified a catalyst. However, a problem arises in that zeolite capable keeping the HC up to 300° C. is not available now and even $C_3H_6$ capable of adsorbing HC at a relatively high temperature violently causes the desorption of the HC at 200° C. and a catalyst located on a downstream side cannot reach an operating temperature (usually 300° C.) by the combination of the action of the endothermic heat caused by the desorption and the action of the adsorbent in the trapper serving as a heat sink. Thus, almost all the desorbed HC is exhausted without being purified.

In the apparatus disclosed in Japanese Patent Application Laid-Open No. 135126/1990, it is described that the catalyst carried by the adsorbent is activated even at the stage that HC begins to desorb from the adsorbent while the catalyst on the downstream side is not sufficiently activated. Thus, HC is purified. However, the catalyst is very slightly activated at a temperature of about 170° C. at which the HC begins to desorb, and further since an exhaust gas has a composition usually controlled to the vicinity of a stoichiometric point of an air/fuel ratio=14.6 (in a fuel rich region at the cold start-up of engine) by an $O_2$ sensor, the exhaust gas is in a substantially rich region (lack of oxygen) when the HC desorbs and causes a decomposition reaction rather than an oxidation reaction. Thus, it cannot be expected that the exhaust gas is activated and thus a large amount of unpurified HC is exhausted.

Further, although Japanese Patent Applications Laid-Open Nos. 75327/1990 and 135126/1990 indicate that Y type and mordenite type are preferable as a type of the zeolite mainly constituting the adsorbent, these types of zeolite have a poor heat resistance and insufficient durability because the zeolite contains a large amount of $Al_2O_3$.

Further, although the catalyst disclosed in Japanese Patent Application Laid-Open No. 56247/1990 intends to serve a three-way catalyst having a high purification ability of HC in particular at the cold start-up of engine and when an air-fuel ratio is in a rich region, a resulting purification ability is not high because the characteristics at the cold start-up of engine are not investigated and a specific operation method is not executed.

Although EP485179 discloses feeding secondary air at a rate of 200 l/min for 50 seconds after engine start-up as operating conditions, this is premised on that an EHC is used. However, the use of the EHC itself does not solve the above problem caused in the system.

Further, although the apparatus employing the bypass system as disclosed in SAE paper No. 920874 operates well as to a purification ability, when it is practically applied, many problems arise in that a system is complex, a heat resistant valve in a piping lacks of reliability, and the like.

Taking the above problems of prior arts into consideration, an object of the present invention is to provide an exhaust gas purification method and apparatus therefor capable of effectively purifying harmful compounds present in an exhaust gas, in particular, HC and the like produced in a large amount at the cold start-up of an engine without the need for a complex system such as an EHC, bypass system and the like.

SUMMARY OF THE INVENTION

To achieve the above object, according to the present invention, there is provided an exhaust gas purification method, which comprises the steps of: using an exhaust gas purification system including an adsorbent containing an adsorbent element capable of adsorbing harmful compounds such as hydrocarbon and the like in an exhaust gas and a catalyst containing a catalyst element for lowering the harmful compounds in the exhaust gas each disposed in the exhaust gas pipe of an internal combustion engine; and adding an oxidizing gas to the exhaust gas or regulating amounts of combustion air and fuel, for a given period, in the process in which the hydrocarbon and the like in the exhaust gas produced at the cold start-up of the internal combustion engine are adsorbed by the adsorbent and desorbed from the adsorbent as a temperature of the adsorbent is increased by the exhaust gas to provide thereby an exhaust gas component containing excessive oxygen whereby the desorbed hydrocarbon and the like are oxidized on the catalyst.

Further, according to the present invention, there is provided an exhaust gas purification method, which comprises the steps of: using an exhaust gas purification system including a catalyst-adsorbent containing an adsorbent element capable of adsorbing harmful compounds such as hydrocarbon and the like in an exhaust gas and a catalyst element for lowering the harmful compounds in the exhaust gas and disposed in the exhaust gas pipe of an internal combustion engine, and further provided with a catalyst containing a catalyst element and disposed in the exhaust gas pipe, when necessary; and adding an oxidizing gas to the exhaust gas or regulating amounts of combustion air and fuel, for a given period, in the process in which the hydrocarbon and the like in the exhaust gas produced at the cold start-up of the internal combustion engine are adsorbed by the catalyst-adsorbent and desorbed from the catalyst-adsorbent as a temperature of the catalyst-adsorbent is increased by the exhaust gas to provide thereby an exhaust gas component containing excessive oxygen whereby the desorbed hydrocarbon and the like are oxidized on the catalyst-adsorbent and on the catalyst further provided, when necessary.

Further, according to the present invention, there is provided an exhaust gas purification apparatus, which comprises an adsorbent containing an adsorbent element capable of adsorbing harmful compounds such as hydrocarbon and the like in an exhaust gas, a catalyst containing a catalyst element for lowering the harmful compounds in the exhaust gas and an oxidizing gas feed means or a means for regulating amounts of combustion air and fuel to provide an exhaust gas component containing excessive oxygen located upstream of the adsorbent and/or the catalyst, each of which is disposed in the exhaust gas pipe of an internal combustion engine.

Further, according to the present invention, there is provided an exhaust gas purification apparatus, which comprises a catalyst-adsorbent containing an adsorbent element capable of adsorbing harmful compounds such as hydrocarbon and the like in an exhaust gas and a catalyst element for lowering the harmful compounds in the exhaust gas, a catalyst containing catalyst element further provided when necessary and an oxidizing gas feed means or a means for regulating amounts of combustion air and fuel to provide an exhaust gas component containing excessive oxygen located upstream of the catalyst-adsorbent and/or the catalyst, each of which is disposed in the exhaust gas pipe of an internal combustion engine.

Note, in the present invention, that the oxidizing gas includes a fluid and the like containing ozone and $O_2$— in addition to secondary air.

BRIEF DESCRIPTION OF THE DRAWINGS

FIG. 8 is a graph showing accumulated values of HC emitted at respective cold start-up of an engine and changing as time elapsed which were obtained as a result of Example 3 and Comparative Example 3.

DETAILED DESCRIPTION OF THE INVENTION

Figure 1:
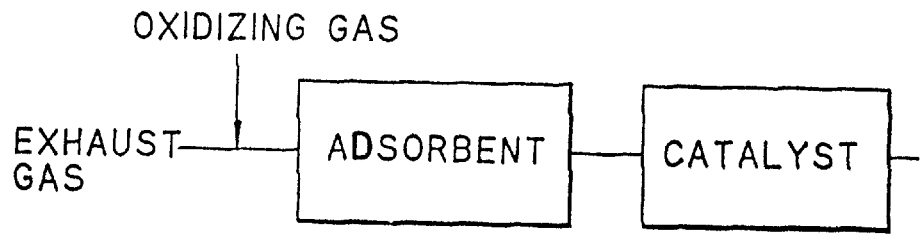
FIG. 1 is a diagram showing an example of arrangement of an exhaust gas purification apparatus according to the present invention.

The structure of the adsorbent, catalyst and catalyst-adsorbent used in an exhaust gas purification method and apparatus therefor of the present invention is not specifically limited, and any of a bead, pellet, honeycomb, ring and the like may be arbitrarily used. From the view point of a pressure loss and resistance to thermal shock, a honeycomb structure composed of cordierite or ferrite type stainless steel having a catalyst element and/or adsorbent element coated thereon is preferably used. Since a catalyst reaction and adsorption are effected at a relatively high speed, when the honeycomb structure is used, its geometrical surface area must be increased, and thus it preferably has a cell density of at least 100 cells/in$^2$.

Note, one or a plurality of the honeycomb structures may be used as or a carrier and one a plurality of the honeycomb structures having the catalyst element and/or adsorbent element coated thereon are disposed in an exhaust gas pipe in the state that they are held in a can body to operate as an exhaust gas purification apparatus.

Examples of a mode for carrying the catalyst element and adsorption element when the honeycomb structure is used as a carrier will be described below:

(1) a catalyst element and adsorption element are carried by a single honeycomb carrier in coexistence;

(2) a catalyst element and an adsorption element are respectively carried upstream and downstream of a honeycomb carrier or vice versa;

(3) catalyst elements are carried upstream of a plurality of honeycomb carriers and adsorption elements are carried downstream thereof, and vice versa; and (4) a catalyst element and adsorption element are carried by a plurality of honeycomb carriers by using the methods (1) and (2).

Among the above methods, the method (1) in which the catalyst element and adsorption element coexist is preferable because when HC and the like are desorbed, they can be smoothly purified by the catalyst element.

Although zeolite, activated charcoal and the like are available as the adsorption element capable of adsorbing harmful compounds such as HC and the like, a heat resistance of at least 500° C. is needed to dispose an adsorbent in an exhaust gas system, and thus zeolite is preferably used.

Zeolite may be any of a natural product and synthetic product and its kind is not particularly specified, but preferably used is zeolite containing $SiO_2/Al_2O_3$ with a mole ratio of at least 20 and more preferably at least 80 from the view point of heat resistance, durability and hydrophobic property. More specifically, ZSM-5, USY, β-zeolite, silicalite, metallosilicate and the like can be preferably used.

Further, not only one kind of zeolite but also several kinds thereof may be used in combination. For example, ZMS-5 having relatively fine micro pores of about 0.55 nm is advantageous for the adsorption of small molecules such as propene and the like, whereas it is disadvantageous for the adsorption of large molecules such as toluene and xylene. On the other hand, USY having relatively large micro pores of about 0.74 nm is disadvantageous for the adsorption of small molecules such as propene and the like, whereas it is advantageous for the adsorption of large molecules such as toluene, xylene and the like. Therefore, it is one of preferable methods to coat the honeycomb structure with the mixture of ZSM-5 and USY. Further, ZSM-5 and USY may be separately carried against a gas flow, and in this case ZSM-5 is preferably carried on an upstream side because it can keep its adsorption ability up to a relatively high temperature of 150° C.

On the other hand, β-zeolite is a preferable adsorbent because it has bimodal fine pores of about 0.55 nm and 0.70 nm and can adsorb both of small molecules and large molecules relatively well.

As described above, preferable adsorption characteristics can be obtained by arbitrarily combining β-zeolite or ZSM-5 and USY and further β-zeolite, ZSM-5 and USY.

Note, although zeolite may be independently used as the adsorption element, it is preferable to carry one or more kinds of noble metals such as Pt, Pd, Rh and the like thereof to control coking occurred in parallel with the adsorption of HC and the like, whereby the adsorption element can be regenerated without lowering the adsorption ability of the zeolite.

Pd is preferably used as the noble metal carried into zeolite because it is cheapest and has a high regenerating ability. An ion exchange method is preferable as a method of carrying the noble metal from the view point of thermal stability. Further, an amount of the noble metal to be carried is preferably 5–40 g/ft³ (in a honeycomb volume) from the view point of cost and regenerating ability. When zeolite is carried on the honeycomb structure, an inorganic binder of $Al_2O_3$ or $SiO_2$ may be contained in an amount of 5–20 wt %, when necessary. With this arrangement, the zeolite can be strongly carried without lowering an adsorption capacity to HC and the like.

As described above, when the noble metal is carried on the zeolite, a catalyst element and adsorption element coexist because the noble metal not only has an ability for regenerating the zeolite but also acts as a catalyst. Since, however, the noble metal in the zeolite is liable to sinter and lacks of durability as the catalyst, the present invention arranges a catalyst-adsorbent by separately adding a durable catalyst element or disposes a honeycomb structure and the like on which a catalyst element is carried as a catalyst.

Although the catalyst element included in the catalyst-adsorbent or catalyst must contain at least one kind of metal selected from Group VIII elements, V, Cr, Mn, Cu, Mo, Ag, W, Re and Au and preferably contains at least one kind of a noble metal such as Pt, Pd, Rh and the like so that the catalyst-adsorbent or catalyst lights-off at a low temperature of about 200° C. when HC and the like are desorbed. Any one of the catalyst-adsorbent and catalyst in the exhaust gas purification system preferably contains Rh from the view point of the usual activity at a high temperature and, in particular, an ability for purifying $NO_x$. On the other hand, any one of the catalyst-adsorbent and catalyst preferably contains Pd to improve the low temperature light-off performance of an exhaust gas containing excessive oxygen. Note, these noble metals are used by being carried on a heat resistant oxide such as $Al_2O_3$, $SiO_2$, $TiO_2$, $ZrO_2$ or the like or composite oxide thereof. In particular, when $Al_2O_3$ with a specific surface area of 100 m²/g or more is used, the noble metal is highly dispersedly carried and thus preferable because the low temperature light-off performance and heat resistance thereof are improved.

Further, the heat resistant oxide is preferably added with 5–36 wt % of oxide having an oxygen storing ability such as $CeO_2$, $La_2O_3$—$ZrO_2$ or the like because the usual activity thereof is improved by it.

A total amount the carried noble metal in the catalyst-adsorbent or catalyst is 20–130 g/ft³ and an amount of carried Rh is preferably in the range of from 2 to 30 g/ft³.

One of the most preferable examples of the catalyst-adsorbent is a layer-type catalyst-adsorbent composed of a honeycomb structure having a surface layer coated with a first layer of a high-silica containing zeolite such as ZSM-5, USY, β-zeolite or the like with a noble metal carried thereon and a second layer composed of composite oxide of $Al_2O_3$—$CeO_2$ with a noble metal carried thereon and coated on the first layer.

In this layer type catalyst-adsorbent, the $Al_2O_3$ mainly constituting the second layer serves as a predryer for selectively adsorbing $H_2O$ contained in an exhaust gas at the cold start-up of engine and increases the adsorption of HC and the like executed by the first layer. In addition, as the temperature of the exhaust gas is increased, the catalyst-adsorbent is heated from the second layer containing the catalyst element on the surface layer side, and thus when the HC and the like adsorbed by the-zeolite component of the first layer are desorbed, the catalyst of the second layer suitably acts. When the HC and the like are desorbed, it is indispensable that an oxidizing gas is added or an exhaust gas composition containing excessive oxygen is provided by adjusting amounts of combustion air and fuel, as described later, which greatly improves the action of the second layer as a catalyst.

Note, even a honeycomb structure having a catalyst element on which a noble metal is carried and a zeolite component each carried thereon in a mixed state instead of being formed to layers acts fairly well.

A weight ratio of the zeolite component to the catalyst element is 50–85:15–50 and the zeolite component is preferably contained in a larger amount. An amount of the zeolite component carried by the honeycomb structure is in the range of 0.05–0.25 g/cc and an amount of the catalyst element carried by the honeycomb structure is in the range of 0.02–0.20 g/cc.

Next, an arrangement of the exhaust gas purification apparatus according to the present invention will be described with reference to the drawings.

FIG. 1 shows an example of the apparatus including an adsorbent, catalyst, and oxidizing gas feed means. Since the adsorbent lacks of an ability for purifying desorbed HC and the like, the catalyst must be disposed downstream thereof. The oxidizing gas feed means is disposed upwardly of the adsorbent and/or catalyst. Although HC and the like produced in a large amount at the cold start-up of engine are adsorbed by the adsorbent once and then begin to desorb as the temperature of an exhaust gas is increased, an oxidizing gas is fed at this time and the exhaust gas is made to a composition containing excessive oxygen, and thus the catalyst exhibits an excellent purifying performance. Note, since the catalyst spaced excessively apart from the adsorbent causes a large heat loss, it is preferably located as near to the adsorbent as possible. An air pump or the like is preferably used as the oxidizing gas feed means.

Figure 2:
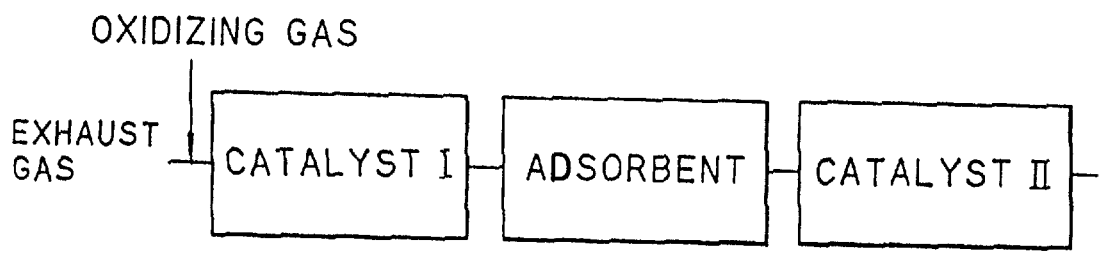
FIG. 2 is a diagram showing an example of arrangement of an exhaust gas purification apparatus according to the present invention.

One of preferable examples to which the apparatus of FIG. 1 is applied is the one having a relatively small catalyst further disposed upstream of the adsorbent, as shown in FIG. 2. In this case, the temperature of an uppermost-stream catalyst I is increased more quickly than that of the catalyst II and lighted-off first under the existence of the oxidizing gas and, as a result, the desorption of HC and the like from the adsorbent is accelerated, whereby the light-off of the catalyst II is accelerated by the heat produced by the oxidization of the HC and CO contained in the exhaust gas as compared with the apparatus shown in FIG. 1 so that the desorbed HC and the like can be purified by the catalyst II. Note, the oxidizing gas feed means is preferably located on the uppermost-stream side. Further, even if any one of the arrangements shown in FIGS. 1 and 2 is employed, it is preferable to contain Rh in any of the catalysts as a catalyst element to maintain a three-way reaction at a high temperature.

Figure 3:
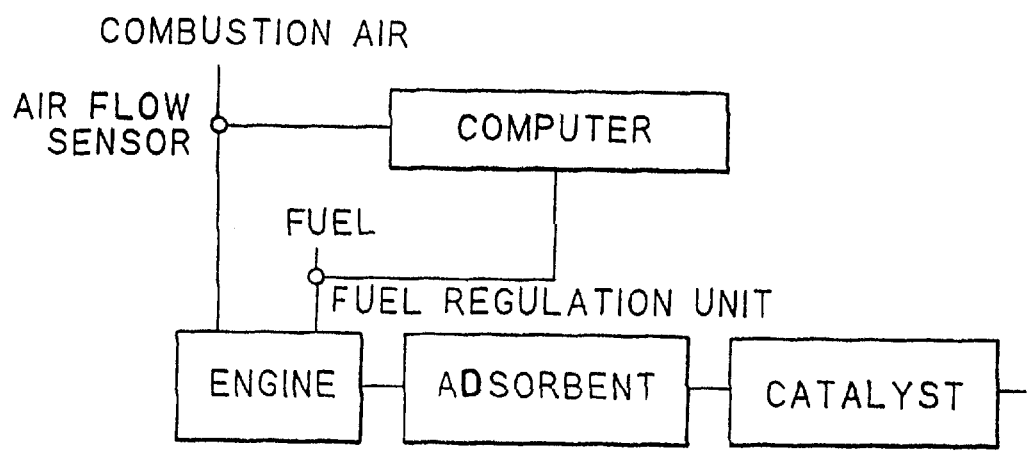
FIG. 3 is a diagram showing an example of arrangement of an exhaust gas purification apparatus according to the present invention.

Although the apparatus shown in FIG. 3 basically belongs to the same example as that shown in FIG. 1, this apparatus is used to propose another apparatus for obtaining an exhaust gas composition containing excessive oxygen, wherein an amount of flow of combustion air is read by an air flow sensor and an amount of fuel to be supplied is controlled by a computer through a fuel regulation unit so that an exhaust gas composition, for example, on a lean side is obtained for a given period.

Figure 4:
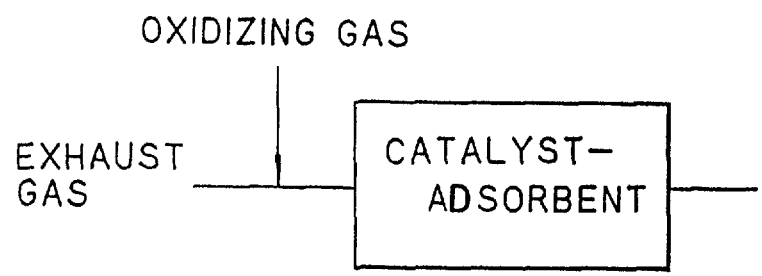
FIG. 4 is a diagram showing an example of arrangement of an exhaust gas purification apparatus according to the present invention.

FIG. 4 shows an example in which only a catalyst-adsorbent is disposed in an exhaust gas pipe. HC and the like produced at the cold start-up of engine are adsorbed once by the catalyst element of the catalyst-adsorbent and begin to desorb as the temperature of an exhaust gas is increased. Since, however, an oxidizing gas is fed at this time, the catalyst element of the catalyst-adsorbent sufficiently acts and exhibits a preferable purification ability. Note, Rh is preferably contained as a catalyst element of the catalyst-adsorbent from the view point of the ability for purifying $NO_x$ and Pd is preferably contained as a catalyst element thereof from the view point of light-off at a low temperature.

Although the catalyst-adsorbent may be arbitrarily located at any position in the exhaust gas pipe, it is preferably located at a position relatively near to an engine exhaust port. When the catalyst-adsorbent is located near to the engine exhaust port, an amount of adsorption of HC and the like is reduced and they begin to desorb in a relatively short time, whereas the catalyst is also lighted-off in a short time. On the contrary, when the catalyst-adsorbent is located apart from the engine exhaust port such as, for example, under a floor, an amount of adsorption of HC and the like is increased and they are desorbed for a long time and further the catalyst acts with a considerable delay. With the feed of the oxidizing gas at the time when HC and the like desorb, the composition of an exhaust gas shifts to a lean side and an emission of $NO_x$ is deteriorated, and thus the oxidizing gas must be fed in a period as short as possible. Therefore, a process for adsorption, desorption and reaction is preferably completed at the cold start-up of engine when an engine is cooled with a less amount of emission of $NO_x$ and thus the catalyst-adsorbent is preferably located relatively near to the engine exhaust port.

As a standard, a mounting position is preferably such a position where adsorption is completed within 140 seconds of Bag 1 (within first mode of Bag 1) and further almost all of HC and the like desorb, when, for example, a honeycomb structure coated only with an adsorption element is disposed in an exhaust gas pipe and an adsorption/desorption curve is measured by preforming an FTP test.

Figure 5:
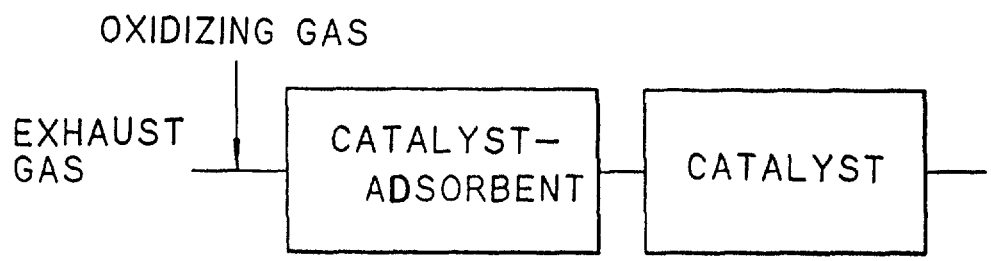
FIG. 5 is a diagram showing an example of arrangement of an exhaust gas purification apparatus according to the present invention.

A catalyst may be also disposed downstream of a catalyst-adsorbent when necessary as shown in FIG. 5 as an example to which the apparatus shown in FIG. 4 is applied. In this case, although the position where the oxidizing gas is fed is disposed upstream of the catalyst-adsorbent and/or catalyst, it is preferably disposed at the uppermost-stream side from the view point of activating the catalyst-adsorbent and catalyst in a shortest possible time. With the arrangement shown in FIG. 5, an area including the catalyst element is increased as compared with that shown in FIG. 4, and further even if HC and the like desorbed by the catalyst-adsorbent are not partially purified, they are purified by the catalyst on the downstream side, and thus this arrangement is more preferable. Note, it is preferable from the view point of an ability for purifying $NO_x$ for any one of the catalyst-adsorbent and catalyst to contain Rh as a catalyst element, and further it is preferable from the view point of the light-off at a low temperature for any one of them to contain Pd.

Further, as shown in FIG. 2, it is also effective to dispose the additional relatively small catalyst upstream of the catalyst-adsorbent. Further, since the catalyst-adsorbent contains the catalyst element, the provision thereof at a downstream end will exhibit an effect to a certain degree.

In the exhaust gas purification method according to the present invention, it is important to start the feed of an oxidizing gas prior to the desorption of HC and the like from the adsorbent or catalyst-adsorbent. When the adsorbent or catalyst-adsorbent is disposed, for example, in the vicinity of an engine exhaust port, i.e., at the position of a manifold in an FTP test performed at a normal temperature (25° C.), since HC and the like begin to desorb in about 30–40 seconds, it suffices to feed the oxidizing gas prior to the occurrence of the desorption. The effect of the feed is not changed even if the feed of the oxidizing gas begins substantially at the same time as engine cranking.

Further, the feed of the oxidizing gas is preferably stopped within one cycle of acceleration/deceleration of Bag 1, i.e., within 140 seconds, taking its rebound to the emission of $NO_x$. Further, it is more preferable to stop the feed of the oxidizing gas after an $O_2$ sensor is operated and before a feedback control is carried out.

On the other hand, when the FTP test is performed at a very low temperature (−7° C.), the desorption of HC and the like from the adsorbent or catalyst-adsorbent is greatly delayed as compared with the desorption occurred in the FTP test performed at the normal temperature. Therefore, it is a standard that the feed the oxidizing gas begins within 80 seconds after engine cranking and is stopped within 280 seconds after the engine cranking.

Note, an oxidizing gas feed hole is preferably located downstream of the $O_2$ sensor. Although different depending upon an engine capacity and a type of the engine, a give amount or variable amount of the oxidizing gas is fed so that an air/fuel ratio of 14.0 or more (a weak reduction side) is achieved or preferably the air/fuel ratio is shifted to a lean side of 14.6–19.0 (an oxidizing side from a stoichiometric point).

The same effect can be also obtained by an engine operation method, that is, a method of obtaining an exhaust gas composition including excessive oxygen by adjusting amounts of combustion air and fuel, in addition to the method of feeding the oxidizing gas. The engine operation method includes, for example, a method of feeding an amount of fuel a little less than a theoretical amount with respect to an amount of air sensed through an air flow sensor or the like by an open loop control (without using an $O_2$ sensor) after an engine is ignited; a method of controlling an amount of fuel, for example, to a lean side by a computer for a give period by using the $O_2$ sensor; and further a method of controlling an amount of fuel to a lean side for a given period by using a PEGO sensor or the like by which an output from the sensor is linearly changed depending upon an air/fuel ratio.

When the engine is ignited, a fuel rich state can achieved from a view point of operability, and thus a device capable of controlling the composition of an exhaust gas by using these methods is needed in addition to a usual system. Although the method of controlling the composition of an exhaust gas by using a sensor is excellent in accuracy, the warming-up of the sensor itself takes a long time. Although this problem is considerably improved by the employment of a sensor with a heater or the like, the feed of the oxidizing gas or the employment of a control device other than the sensor is preferable to obtain an exhaust gas composition containing excessive oxygen relatively earlier after engine cranking. Further, it is one of preferable methods to use the method of feeding an oxidizing gas and the method of controlling the amounts of combustion air and fuel at the same time to obtain an exhaust gas composition containing excessive oxygen.

Note, the exhaust gas composition containing excessive oxygen described here means a composition shifted to an oxygen excessive side with respect to the composition of an exhaust gas obtained at the cold start-up of a usual engine not provided with a specific control means. To describe more specifically by using a vehicle provided with a gasoline engine as an example, an air/fuel ratio of 14.0 or more (a weak reduction side) is achieved or the air/fuel ratio is preferably shifted to a lean side of 14.6–19.0 (an oxidizing side from a stoichiometric point). The oxidizing ability of the catalyst-adsorbent and/or catalyst is greatly activated by the shift to the lean side as described above. Note, when reformulated gasoline and methanol are used as fuel, the theoretical air/fuel ratio thereof is changed. Thus, in this case, the air/fuel ratio of these fuels is preferably shifted to a lean side so that the same value as above is achieved by converting aforesaid air/fuel ratio by a stoichiometric ratio $\lambda$.

Although the present invention will be described in more detail with reference to examples, it is not limited thereto.

EXAMPLE 1

[Preparation of Absorbents]

First, two kinds of powder made by PQ Corporation, ZSM-5 ($SiO_2/Al_2O_3$, mole ratio=280) and USY ($SiO_2/Al_2O_3$, mol ratio:=100) were added with an aqueous solution containing $(NH_3)_4PdCl_2$, kept at a temperature 80°–90° C., and then subjected to an ion exchange while being stirred. After the ion exchange, the two kinds of powder were dried, and calcined at 500° C. once to obtain two kinds of zeolite powder each containing Pd. The resulting two kinds of powder were added with water and $Al_2O_3$ sol in an amount of 5% when converted to oxide and further added with a slight amount of acetic acid and ground in a wet state for 15 hours to obtain two kinds of slurry to be carried.

Next, two cordierite carriers (5.66 inches dia., 6 mil/400 $cpi^2$, 1.2 liter) were immersed in the resulting two kinds of slurry to carry the same in an amount of 0.15 g/cc, followed by drying and firing at 500° C. An adsorbent A by which Pd-ZSM-5 was carried and an adsorbent B by which Pd-USY was carried were obtained in the above processes. Note, Pd was carried in an amount of 10 $g/ft^3$ by both of the adsorbents A and B. The adsorbent A was held upstream of a can body and the adsorbent B was held downstream thereof and these adsorbents were evaluated as follows.

[Evaluation of Absorbents]

An in-line 4 type test vehicle with a displacement of 2000 cc was used and the aforesaid adsorbents (2.4 liters in total) were set at the position apart from an engine exhaust port by 350 mm and an FTP test was performed.

Figure 6:
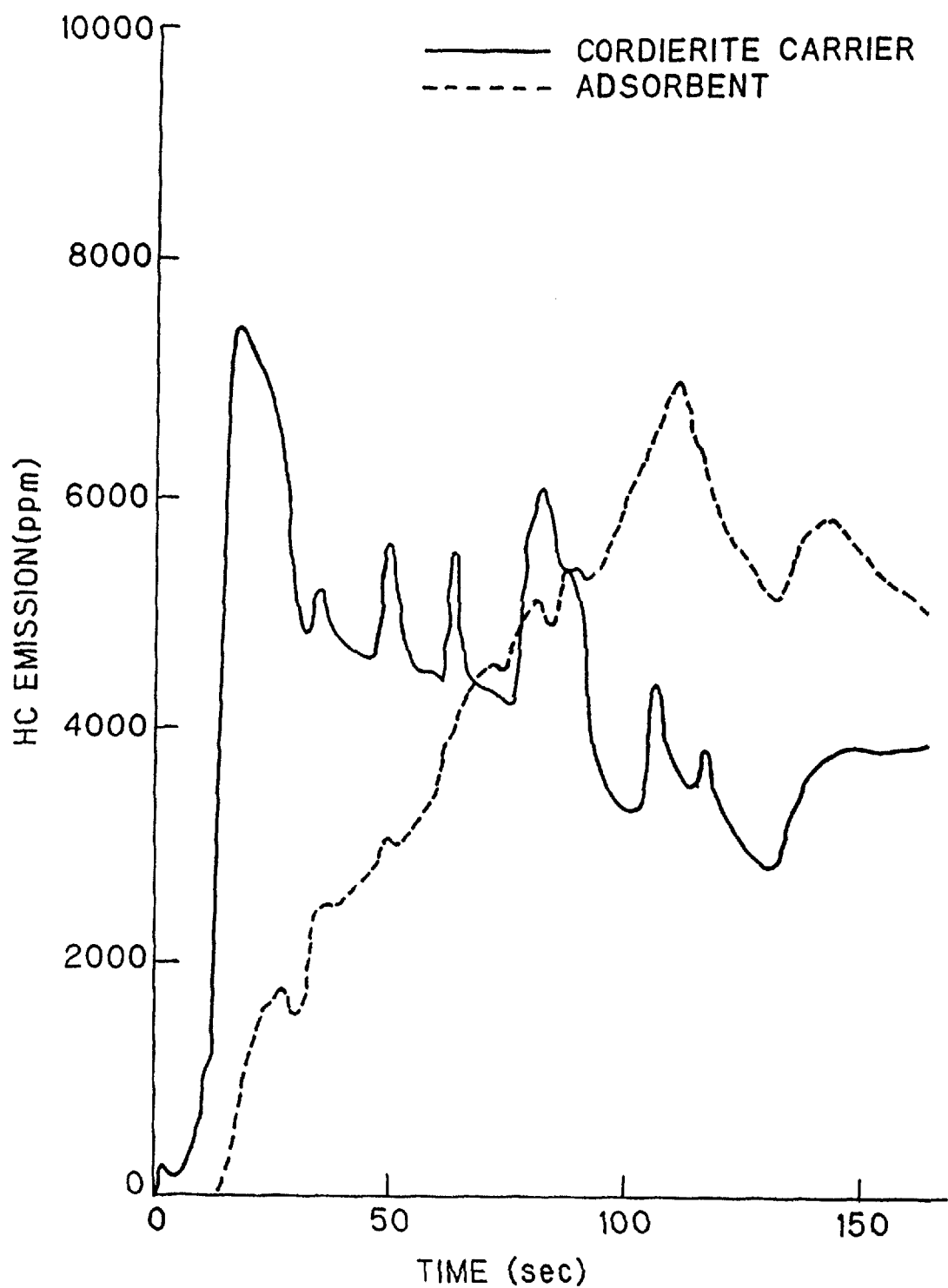
FIG. 6 is a graph showing values of HC emitted at respective cold start-up of an engine and changing as time elapsed which were obtained as a result of an FTP test performed by using an adsorbent composed of a cordierite carrier and a zeolite component coated thereon.

FIG. 6 shows amounts of HC emitted at the cold start-up of engine and changing as time elapsed which were obtained by the present test. Note, the results obtained by using a cordierite carrier of 2.4 liters not coated with an adsorbent are also shown in FIG. 6 for comparison.

The undermentioned is apparent from FIG. 6:

(1) HC is adsorbed by the adsorbents for about 40 seconds after engine cranking and thereafter shifts to desorption;

(2) an amount of emission from the adsorbents is smaller than an amount of emission from the cordierite carrier up to the point where the emission curve of the cordierite carrier intersects the emission curve of the adsorbents, that is, for 70 seconds. Thus, the adsorbents effectively act for this period; and (3) the desorption of HC reaches to a peak after about 110 seconds and a considerable amount of HC is desorbed within 140 seconds.

[Preparation of Catalyst]

Commercially available $\gamma$-$Al_2O_3$ with a specific surface area of 200 $m^2/g$ was added with cerium acetate and cerium oxide in an amount of 30 wt % when converted to oxide and ground in a wet state, followed by drying and calcining at 550° C. to obtain a composite oxide of $Al_2O_3 \cdot CeO_2$. Noble metals Pt and Rh were impregnated into the resulting composite oxide, respectively by using aqueous solutions containing $H_2PtCl_6$, $Rh(NO_3)_3$, followed by drying and firing at 500° C. to obtain two kinds of noble metal carrying $Al_2O_3 \cdot CeO_2$ powder. Further, water and acetic acid each in a suitable amount were independently added to the two kinds of the noble metal carrying $Al_2O_3 \cdot CeO_2$ powder. Then, the Pt carrying $Al_2O_3 \cdot CeO_2$ powder in an amount of 0.15 g/cc was first carried by a cordierite carrier (5.66 inch dia., 6 mil/400 $cpi^2$, 1.7 liters) as a first catalyst layer, then the Rh carrying $Al_2O_3 \cdot CeO_2$ powder in an amount of 0.05 g/cc was coated on and carried by the first catalyst layer as a second catalyst layer and finally they were fired at 500° C. to prepare a catalyst. Note, these noble metals were carried by the catalyst in an amount of 40 g/ft$^3$ (Pt/Rh=1/5).

[Purification System and Evaluation]

A test vehicle was used in the same way as the evaluation of the adsorbents and the aforesaid adsorbents (2.4 liters in total) were set at the position apart from an engine exhaust port by 350 mm and further the aforesaid catalyst was set at the position apart from the engine exhaust port by 850 mm so that the catalyst was located relatively adjacent to the adsorbents. Secondary air was fed from the position 100 mm upstream of the adsorbents by an air pump at a rate of 160 l/min for 100 seconds after engine cranking, and then the FTP test was performed. Note, although an air-fuel ratio exhibited a value of 12.5–13.5 before the feed of the secondary air, it exhibited a value of 15.0–17.5 after the feed of the secondary air. Table 1 shows resulting emission values.

COMPARATIVE EXAMPLE 1

[Purification System and Evaluation]

Evaluation was performed by using the same purification system as that of Example 1 without the feed of secondary air. Table 1 shows resulting emission values.

EXAMPLE 2

[Preparation of Catalyst-Absorbent]

A catalyst-adsorbent composed of a first layer (inner layer) containing a zeolite component exhibiting a HC adsorption ability and a second layer (surface layer) containing a catalyst element exhibiting an ability as a three-way catalyst was prepared by causing the catalyst element to be carried by the adsorbents A and B shown in Example 1 in the following procedure.

First, commercially available $\gamma$-Al$_2$O$_3$ with a specific surface area of 200 m$^2$/g was added with cerium acetate and cerium oxide in an amount of 30 wt % when converted to oxide and ground in a wet state, followed by drying and calcining at 550° C. to obtain $\gamma$-Al$_2$O$_3$·CeO$_2$ composite oxide. Noble metals Pt, Rh and Pd were impregnated into the resulting composite oxide, respectively, by using aqueous solutions containing H$_2$PtCl$_6$, Rh(NO$_3$)$_3$, and (NH$_4$)$_3$PdCl$_2$, followed by drying and firing at 500° C. to obtain three kinds of noble metal carrying Al$_2$O$_3$·CeO$_2$ powder. Further, a slight amount of water and acetic acid were added to the three kinds of the noble metal carrying Al$_2$O$_3$·CeO$_2$ powder to prepare three kinds of slurry to be carried. The above adsorbents A and B were immersed into the slurry to carry 0.05 g/cc of the catalyst element to the surface layer thereof, followed by drying and firing at 500° C. to obtain a catalyst-adsorbent. The noble metals as the catalyst elements were carried in a total amount of 40 g/ft$^3$ at a ratio of Pt:Pd:Rh=2:3:1. (Note, the catalyst-adsorbent as a whole carried the noble metals in an amount of 50 g/ft$^3$.)

[Purification System and Evaluation]

Only the above catalyst-adsorbent was set to the same position as that of Example 1 (a catalyst was not provided on a downstream side) and evaluated by the same method as that of Example 1. Table 1 shows resulting emission values.

EXAMPLE 3

[Purification System and Evaluation]

Figure 7:
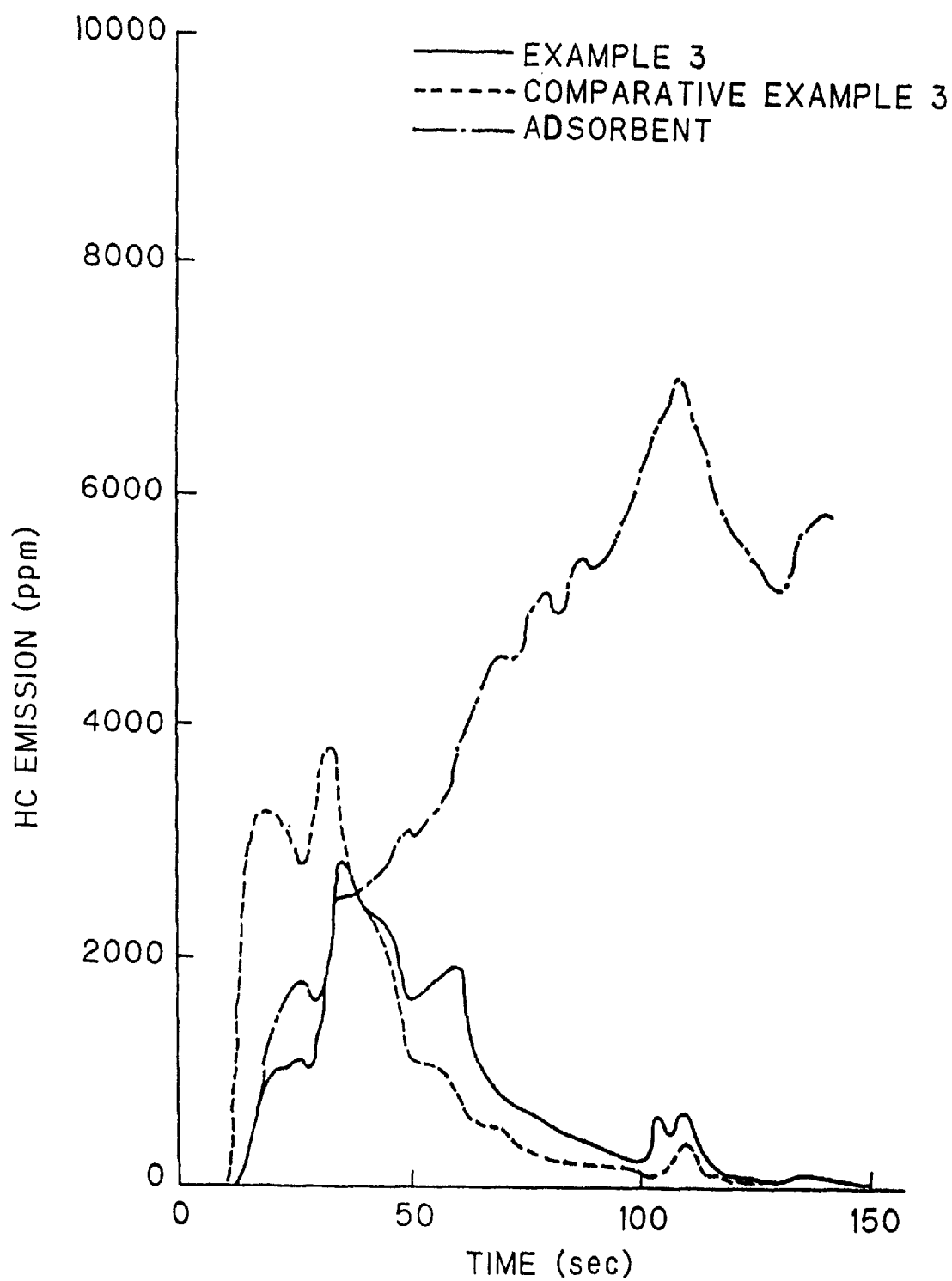
FIG. 7 is a graph showing values of HC emitted at respective cold start-up of engine and changing as time elapsed which were obtained as a result of Example 3 and Comparative Example 3.

The same catalyst-adsorbent as that of Example 2 was used in place of the adsorbent of Example 1 and evaluation was performed by the same method as that of Example 1 (a catalyst was provided on a downstream side). Table 1 shows the emission values, FIG. 7 shows amounts of HC changing as time elapsed, and FIG. 8 shows integrated emission values at the cold start-up of engine in this case, respectively.

EXAMPLE 4

The FTP test was performed by using the same purification system as that of Example 1 and starting the feed of secondary air in 20 seconds after engine cranking.

Note, the feed of the secondary air was stopped in 100 seconds after the engine cranking and thus it was fed for 80 seconds. Table 1 shows resulting emission values.

EXAMPLE 5

[Purification System and Evaluation]

The same purification system as that of Example 3 was used, an amount of combustion was sensed by a mass flow sensor and an adjustment was executed so that operation was carried out by shifting an air/fuel ratio to a lean side for 100 seconds in 20 seconds after engine cranking. Note, the air/fuel ratio exhibited a value 14.6–15.2 during this period. Table 1 shows resulting emission values.

COMPARATIVE EXAMPLE 2

[Purification System and Evaluation]

Evaluation was performed by using the same purification system as that of Example 3 without feeding secondary air and without employing any particular processing for shifting a value of the air/fuel ratio to a lean side. Table 1 shows resulting emission values.

COMPARATIVE EXAMPLE 3

[Purification System and Evaluation]

Evaluation was performed by the same way as that of Example 3 except that a three-way catalyst of 2.41 (not containing a zeolite component) was used in place of the catalyst-adsorbent to confirm a catalyst volume increasing effect. Note, the three-way catalyst was prepared in the same way as that of Examples so that noble metals were carried in a total amount of 40 g/ft$^3$ at a ratio of Pt:Pd:Rh=2:3:1 with an amount of a carried wash coat of 0.20 g/cc. FIGS. 7 and 8 and Table 1 show the result of the evaluation.

TABLE 1

| | | FTP Total Emission (g/M) | | |
| --- | --- | --- | --- | --- |
| | | CO | HC | NO$_x$ |
| Example | 1 | 0.38 | 0.070 | 0.20 |
| | 2 | 0.32 | 0.064 | 0.19 |
| | 3 | 0.28 | 0.052 | 0.17 |
| | 4 | 0.27 | 0.053 | 0.17 |
| | 5 | 0.33 | 0.055 | 0.16 |
| Comparative | 1 | 2.15 | 0.185 | 0.19 |
| Example | 2 | 1.93 | 0.151 | 0.14 |
| | 3 | 0.40 | 0.080 | 0.21 |

It can be found from Table 1 that the total emissions of HC in Examples, in which secondary air was added to the purification systems as an oxidizing gas or operation was adjusted so that a value of the air/fuel ratio was shifted to a lean side, were greatly reduced to about one third those of Comparative Examples 1 and 2 in which no secondary air was added to the purification systems and no particular processing was employed to shift a value of the air-fuel ratio to the lean side. Further, the amounts of HC in Examples were reduced even compared with that of Comparative example 3 in which secondary air was fed to the three-way catalyst having the same volume as that of the catalyst-adsorbent in place thereof, and thus it can be found that the combination of the exhaust gas purification system of the present invention and the feed of secondary air (addition of an oxidizing gas) is very effective to remove HC at the cold start-up of engine. Further, the emission of CO is also greatly reduced in Examples. On the other hand, although $NO_x$ is a little deteriorated by the feed of the secondary air, the ratio thereof is very low and the three kinds of the components in an exhaust gas exhibit a good emission.

With reference to FIGS. 7 and 8, from the fact that an emission of HC at the cold start-up of engine in Example 3 exhibits the same exhaust amount as that of the adsorbent for 0–35 seconds after cranking, it can be found that adsorption is quickly proceeded by the first layer composed of the zeolite component during this period and thereafter the second layer composed of the three-way catalyst element is oxidized to effectively act to the desorption of HC.

What is claimed is:

1. An exhaust gas purification method, comprising the steps of:
   providing an exhaust gas purification system including an adsorbent containing an adsorbent element for adsorbing hydrocarbon compounds in an exhaust gas and a catalyst containing a catalyst element for lowering said hydrocarbon compounds in said exhaust gas, each disposed in an exhaust gas pipe of an internal combustion engine, wherein the catalyst is provided downstream of the adsorbent, and wherein the system is devoid of a valve between the adsorbent and the catalyst; and
   adding an oxidizing gas to said exhaust gas at a position upstream of the catalyst, over a duration during which substantial completion of desorption of said hydrocarbon compounds from the adsorbent is effected as a temperature of the adsorbent is increased by said exhaust gas, thereby shifting the exhaust gas to an oxygen rich state from a stoichiometric point whereby the desorbed hydrocarbon compounds are oxidized on the catalyst, said duration being not more than 140 seconds from cold start-up of the internal combustion engine.

2. An exhaust gas purification method according to claim 1, wherein said oxidizing gas is added substantially at the same time as the start of the internal combustion engine or prior to desorption of said hydrocarbon compounds from the adsorbent.

3. An exhaust gas purification method according to claim 1, wherein the adsorbent element contained in the adsorbent consists essentially of zeolite.

4. An exhaust gas purification method according to claim 1, wherein the catalyst element contained in the catalyst contains at least one metal selected from the group consisting of Group VIII elements, V, Cr, Mn, Cu, Mo, Ag, W, Re and Au.

5. The exhaust gas purification method of claim 1, wherein said exhaust gas purification system includes a plurality of adsorbents including a furthermost downstream adsorbent, and the catalyst is provided downstream of the furthermost downstream adsorbent.

6. The exhaust gas purification method of claim 1, wherein said exhaust gas purification system includes a plurality of adsorbents including a furthermost downstream adsorbent, and a plurality of catalysts including a furthermost downstream catalyst, and the furthermost downstream catalyst is provided downstream of the furthermost downstream adsorbent.

7. An exhaust gas purification method, comprising the steps of:
   providing an exhaust gas purification system including a catalyst-adsorbent structure containing an adsorbent element for adsorbing hydrocarbon compounds in an exhaust gas and a first catalyst element for lowering the hydrocarbon compounds in the exhaust gas, the catalyst-adsorbing structure being disposed in an exhaust gas pipe of an internal combustion engine, said exhaust gas purification system including a catalyst containing a second catalyst element positioned within the exhaust gas pipe, wherein the second catalyst element is located downstream of the catalyst-adsorbent structure, and wherein the system is devoid of amy valve between the catalyst-adsorbent structure and the second catalyst element; and
   adding an oxidizing gas to said exhaust gas at a position upstream of the catalyst-adsorbent structure, over a duration during which substantial completion of desorption of said hydrocarbon compounds from the catalyst-adsorbent structure is effected as a temperature of the catalyst-adsorbent structure is increased by said exhaust gas, thereby shifting the exhaust gas to an oxygen rich state from a stoichiometric point whereby said desorbed hydrocarbon compounds are oxidized on the catalyst-adsorbent structure, said duration being not more than 140 seconds from cold start-up of the internal combustion engine.

8. An exhaust gas purification method according to claim 7, wherein said oxidizing gas is added substantially at the same time as the start of the internal combustion engine or prior to desorption of said hydrocarbon compounds from the catalyst-adsorbent structure.

9. An exhaust gas purification method according to claim 7, wherein the adsorbent element contained in the catalyst-adsorbent structure consists essentially of zeolite.

10. An exhaust gas purification method according to claim 7, wherein the first catalyst element contained in the catalyst-adsorbent structure contains at least one metal selected from the group consisting of Group VIII elements, V, Cr, Mn, Cu, Mo, Ag, W, Re and Au.

11. An exhaust gas purification apparatus, comprising:
    an exhaust gas pipe through which an exhaust gas stream from an internal combustion engine flows;
    a catalyst-adsorbent disposed in said exhaust gas pipe, said catalyst-adsorbent containing an adsorbent element for adsorbing hydrocarbon compounds in the exhaust gas stream and a catalyst element located downstream of said adsorbent element for lowering said hydrocarbon compounds in said exhaust gas stream; and
    oxidizing gas feed means for feeding oxidizing gas upstream of said catalyst-adsorbent, wherein the apparatus does not contain a heater and is devoid of any valve between said adsorbent element and said catalyst element.

12. An exhaust gas purification apparatus, comprising:
    an exhaust gas pipe through which an exhaust gas stream from an internal combustion engine flows;
    a catalyst-adsorbent containing an adsorbent element for adsorbing hydrocarbon compounds in the exhaust gas stream and a first catalyst element for lowering said hydrocarbon compounds in said exhaust gas stream;
    a catalyst containing a second catalyst element and located downstream of said catalyst-adsorbent, wherein said catalyst-adsorbent and said catalyst are disposed in said exhaust gas pipe; and
    oxidizing gas feed means for feeding oxidizing gas upstream of at least one of said catalyst-adsorbent and said catalyst, wherein the apparatus does not contain a heater and is devoid of any valve between said catalyst-adsorbent and said catalyst.

* * * * *